United States Patent
Johnson et al.

(10) Patent No.: US 9,207,653 B2
(45) Date of Patent: Dec. 8, 2015

(54) CONTROL SYSTEM AUTO-TUNING

(75) Inventors: Donald Bryce Johnson, Algonac, MI (US); Norman Malcolm Newberger, White Lake, MI (US)

(73) Assignee: Horiba Instruments Incorporated, Irvine, CA (US)

( * ) Notice: Subject to any disclaimer, the term of this patent is extended or adjusted under 35 U.S.C. 154(b) by 596 days.

(21) Appl. No.: 13/618,277

(22) Filed: Sep. 14, 2012

(65) Prior Publication Data

US 2014/0081426 A1 Mar. 20, 2014

(51) Int. Cl.
G05B 13/02 (2006.01)

(52) U.S. Cl.
CPC .. *G05B 13/0215* (2013.01); *G05B 2219/13103* (2013.01); *G05B 2219/42134* (2013.01); *G05B 2219/42137* (2013.01); *G05B 2219/42139* (2013.01); *G05B 2219/42145* (2013.01); *G05B 2219/42147* (2013.01); *G05B 2219/42152* (2013.01)

(58) Field of Classification Search
CPC ........... G05B 2219/13103; G05B 2219/42134; G05B 2219/42152; G05B 2219/42137; G05B 2219/42139; G05B 2219/42145; G05B 2219/42147
USPC .......................................... 700/28, 31–32, 37
See application file for complete search history.

(56) References Cited

U.S. PATENT DOCUMENTS

| | | | | |
|---|---|---|---|---|
| 4,943,759 A * | 7/1990 | Sakamoto et al. | ............ | 700/261 |
| 5,406,474 A * | 4/1995 | Hansen | ............ | 700/37 |
| 5,420,785 A * | 5/1995 | Shinskey | ............ | 700/37 |
| 5,568,377 A * | 10/1996 | Seem et al. | ............ | 700/37 |
| 6,487,459 B1 * | 11/2002 | Martin et al. | ............ | 700/44 |
| 6,546,295 B1 * | 4/2003 | Pyotsia et al. | ............ | 700/37 |
| 7,170,581 B2 * | 1/2007 | Tousain | ............ | 355/53 |
| 2002/0016648 A1 | 2/2002 | Fujita et al. | | |
| 2008/0208778 A1 * | 8/2008 | Sayyar-Rodsari et al. | ..... | 706/12 |
| 2011/0074330 A1 | 3/2011 | Ellis et al. | | |
| 2012/0053704 A1 * | 3/2012 | MacArthur et al. | ............ | 700/29 |

FOREIGN PATENT DOCUMENTS

KR 100666000 B1 1/2007

* cited by examiner

*Primary Examiner* — Ronald Hartman, Jr.
(74) *Attorney, Agent, or Firm* — Brooks Kushman P.C.

(57) ABSTRACT

A control system includes a controller. The controller repeatedly excites a control loop characterized by parameters having randomly selected values for each excitation and scores a response of the control loop to each excitation relative to a target signal until the scores no longer achieve a value less than a minimum of the scores for a predefined number of excitations occurring after the excitation yielding the minimum of the scores to auto-tune the control system.

15 Claims, 1 Drawing Sheet

CONTROL SYSTEM AUTO-TUNING

TECHNICAL FIELD

This disclosure relates to auto-tuning of control systems.

BACKGROUND

A control system typically includes a controller and a plant (e.g., a motor driving a load). The plant is connected to the controller through a feedback loop. In operation, the plant is controlled by output of the controller. Output of the plant is fed back to the controller via the feedback loop and is subtracted from a reference input to form an error signal. This error signal is processed by the controller to generate a modified control input to the plant.

A controller typically includes filters and control algorithms. Control algorithms amplify error signals and add feed-forward terms to create command signals. These control algorithms are tuned to maintain optimized command response, disturbance rejection, stability, and noise susceptibility in the presence of changes in characteristic properties such as plant inertia, resonance due to compliance, backlash, friction etc.

Control algorithms, such as PID (Proportional-Integral-Derivative) control algorithms, are widely used. A PID type control algorithm is so named because its control output is derived from a weighted sum of a term proportional to the input, a term proportional to the integral of the input, and a term proportional to the derivative of the input. Such control algorithms include a proportional amplification unit with a proportional gain parameter, $K_P$, an integration unit with an integration gain parameter, $K_I$, and a derivative unit with a derivative gain parameter, $K_D$.

Tuning control algorithms includes setting or adjusting associated gains to achieve desired performance. Since stability of a motion controller may vary due to interaction with load condition, for example, gains of the control algorithms should be tuned (adjusted) regularly to operate effectively for the specified application. Poorly tuned control algorithms either act aggressively or sluggishly, or with insufficient margins of stability. When uncertainty in disturbance or process dynamic characteristics is large, tuning of control algorithms is often difficult. As a result, the tuning process usually requires manual tuning by an experienced technician. Manual tuning, however, can be tedious and non-optimal.

SUMMARY

A controller performs a plurality of trials that each result in a score until the scores no longer achieve a value less than a minimum of the scores for a predefined number of trials occurring after the trial yielding the minimum of the scores. Each of the trials include the steps of providing a demand signal to a control loop having parameters, comparing a target signal to a response to the demand signal, generating a score based on the comparison, and randomly adjusting values of the parameters. The controller further outputs parameter values that yielded the minimum of the scores. The target signal may have a magnitude and spectral content less than or equal to a magnitude and spectral content of the demand signal. The demand signal may represent white noise or broad spectrum noise. The target signal may be a filtered version of the demand signal. The target signal may be based on the demand signal and a selectable dynamic factor that determines an extent to which the demand signal is filtered. A maximum value of the dynamic factor may correspond to a maximum frequency of the demand signal. The comparison may be performed in the frequency domain.

Another controller performs a plurality of trials that each result in a score until the scores no longer achieve a value less than a minimum of the scores for a predefined number of trials occurring after the trial yielding the minimum of the scores. Each of the trials include the steps of providing a demand signal to a control loop having parameters, comparing a target signal to a response to the demand signal in the frequency domain, the target signal being a filtered version of the demand signal, generating a score based on the comparison, and adjusting values of the parameters. The controller further outputs parameter values that yielded the minimum of the scores. The target signal may have a magnitude and spectral content less than or equal to a magnitude and spectral content of the demand signal. The demand signal may represent white noise or broad spectrum noise. A selectable dynamic factor may determine an extent to which the demand signal is filtered. A maximum value of the dynamic factor may correspond to a maximum frequency of the demand signal.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Two issues often encountered when developing an auto tuning control system are generating an accurate model of the system and generating a target signal for the system to tune against. Several techniques are known for generating accurate system models and hence are not discussed in detail herein. Several techniques are also known for generating target signals. These techniques, however, may focus on a particular type of signal: the step response. Although the step response may have desirable theoretical or mathematical properties, some plant models may not respond well to it. Certain target signals described herein may be filtered versions of demand signals. Hence, parameters may be tuned against a response that is actually achievable by the system.

Prior auto tuning algorithms may exhibit a tendency to converge on solutions that are not optimal because tuning parameters are adjusted in the direction that yields improvement. That is, changes to tuning parameters are based on improved results from previous iterations. If error between a target signal and system response is represented as a curve having several valleys (with one of the valleys being the global minimum and the other of the valleys being local minimum), prior auto tuning algorithms may converge on a solution that yields a local minimum for error rather than the global minimum for error. Certain auto tuning techniques described herein may randomly adjust tuning parameters over a number of iterations to avoid the issue of converging on a local minimum rather than the global minimum.

Figure 1:
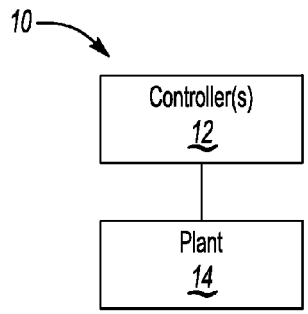
FIG. 1 is a block diagram of a test arrangement.

Referring to FIG. 1, a typical test arrangement 10 includes at least one controller 12 operatively arranged with a plant 14 (e.g., a motor driving a load, etc.).

Figure 2:
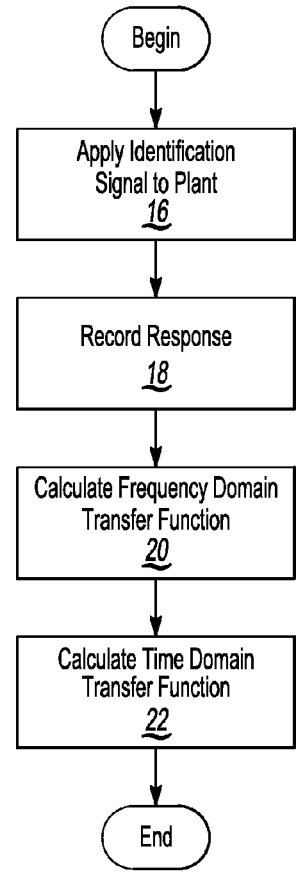
FIG. 2 is flow chart of an algorithm for characterizing a control system.

Referring to FIG. 2, an identification signal (representing shaped noise for example) is applied to a plant under test to excite the plant at operation 16. The identification signal may have spectral content across the frequency range of interest. It also may be of reduced amplitude and generally shaped so as to not harm the plant. The plant (and I/O subsystems of the controller applying the identification signal) then generate a characteristic response (e.g., a speed or torque response). At operation 18, the response is recorded. At operation 20, the frequency domain transfer function, H(F), is calculated based on the identification signal and response. Such calculations are well known and need not be discussed here. At operation 22, the corresponding time domain transfer function, h(t), is calculated. The inverse fast Fourier transform of H(F), for example, can be calculated to yield h(t). h(t) it thus a model of the plant (and the I/O subsystems of the controller applying the identification signal).

A control loop representing the controller used to apply the identification signal to the plant is applied to h(t). Output of the control loop is convolved with h(t) to generate feedback that represents feedback of the plant (and the I/O subsystems of the controller associated therewith). This feedback and a target signal are driven into the control loop in a classical command-feedback fashion to close the loop. Because gains of the control loop need to be adjusted in the time domain, the simulation is run in the time domain.

Figure 3:
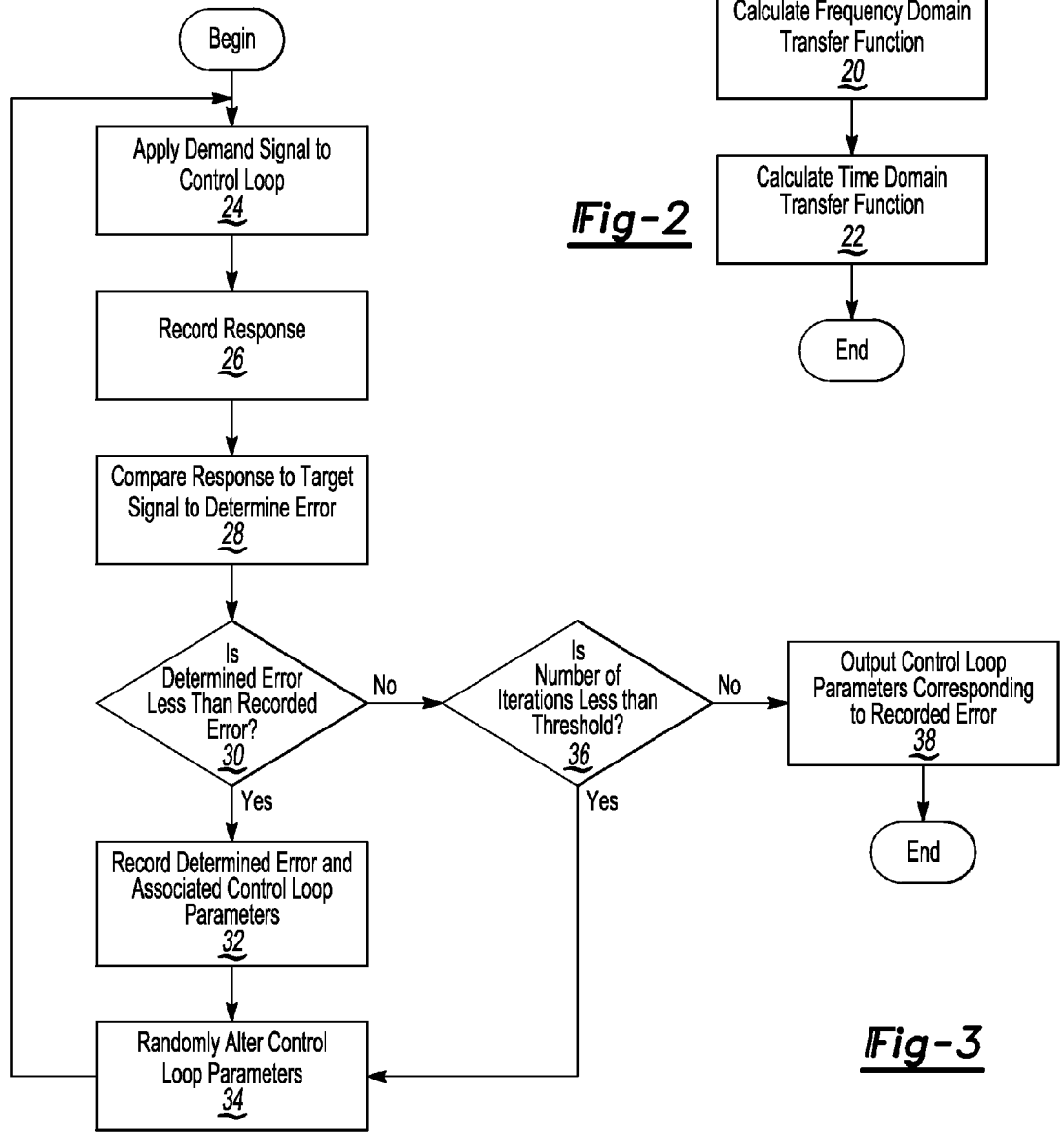
FIG. 3 is a flow chart of an algorithm for auto tuning parameters of a control loop applied to a transfer function representing a control system.

Referring to FIG. 3, a demand signal is applied to the control loop at operation 24. The demand signal, in this example, is a random wave form. At operation 26, the resulting response is recorded. At operation 28, the response is compared with a target signal. This (amplitude) comparison is done in the frequency domain as a phase difference between the response and target signal may exist in the time domain. An error value, for example, may be calculated as the absolute sum of differences of each spectral component. A higher weight may be given to the first three spectral components to ensure that low frequency components are well reproduced.

The target signal may be generated, for example, by filtering a random waveform. (Step functions are typically used for target signals. Step functions, however, may lack sufficient spectral content across the frequency range of interest. Additionally, it may be difficult to appropriately define system delay time, ramp rate and overshoot.) The random waveform may be the same as or different than that used for the demand signal. If different, the random waveform may have a lower frequency content compared to the demand signal. Hence, magnitude and spectral content of such target functions will be equal to or less than corresponding demand signals. That is at best, the system's response to the demand signal will mimic the demand signal. Subsequent control loop tuning, as a result, will be based on a signal that is achievable.

To alter the responsiveness of the system, various filters may be used to filter the waveform. In one example, a sinc filter in the frequency domain is used as it can represent a corner rounding of a step function in the time domain. The extent of filtering may be determined by a user selectable dynamic factor. A dynamic factor of 1, in certain examples, means that the target function is the same as the demand signal. A dynamic factor of 0, in these same examples, means that the target function is a heavily filtered version of the demand signal. Other scenarios, however, are also possible.

At operation 30, it is determined whether the error is less than any recorded error. If yes, the determined error is recorded at operation 32. If, for example, a previous iteration yielded an error value of 5 and the current iteration yielded an error value of 3, the error value of 3 and its corresponding gain parameters would be saved in place of the error value of 5 and its corresponding gain parameters—the goal being to minimize the error value and identify the corresponding gain parameters that yield the minimum error value. Because such error calculations necessarily result in high error numbers when the control loop becomes unstable, gain parameters that cause instability are rejected. Hence, no consideration needs to be given to phase or gain margin. At operation 34, the control loop parameters are randomly altered by way of, for example, a random number generator. The algorithm then returns to operation 24. 300 to 400 iterations, for example, may be necessary to identify the global minimum error value.

Returning to operation 30, if no, it is determined whether the number of iterations performed since the last time a new lowest error value was found is less than a threshold at operation 36. If yes, the algorithm returns to operation 34. If no, control parameters associated with the recorded (and thus minimum) error value are output at operation 38. If, for example, 50 iterations have been performed and none have yielded an error value that is less than the minimum error value found thus far, control parameters associated with the minimum error value are output. The algorithm then ends.

As apparent to those of ordinary skill, the above described algorithms do not directly attempt to achieve a particular stability or phase margin. Accepted low error values necessarily correspond to systems that are stable and rejected high error values may correspond to systems that are unstable. Similarly, insufficient phase margin will result in an unstable system, and thus (rejected) high error values.

The processes, methods, or algorithms disclosed herein can be deliverable to/implemented by a processing device, controller, or computer, which can include any existing programmable electronic control unit or dedicated electronic control unit, such as the controller 12. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. Alternatively, the processes, methods, or algorithms can be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A control system comprising:
   at least one processor configured to
      perform a plurality of trials that each result in a score until the scores no longer achieve a value less than a minimum of the scores for a predefined number of trials occurring after the trial yielding the minimum of the scores, each of the trials including
         (i) providing a demand signal to a control loop having parameters,
         (ii) comparing a target signal to a response to the demand signal,
         (iii) generating a score based on the comparison, and
         (iv) randomly adjusting values of the parameters, and
      output parameter values that yielded the minimum of the scores to auto-tune the control system.

2. The system of claim 1 wherein the target signal has a magnitude and spectral content less than or equal to a magnitude and spectral content of the demand signal.

3. The system of claim 1 wherein the demand signal represents white noise or broad spectrum noise.

4. The system of claim 3 wherein the target signal is a filtered version of the demand signal.

5. The system of claim 3 wherein the target signal is based on the demand signal and a selectable dynamic factor that determines an extent to which the demand signal is filtered.

6. The system of claim 5 wherein a maximum value of the dynamic factor corresponds to a maximum frequency of the demand signal.

7. The system of claim 1 wherein the comparison is performed in frequency domain.

8. A control system comprising:
   at least one processor configured to
      perform a plurality of trials that each result in a score until the scores no longer achieve a value less than a minimum of the scores for a predefined number of trials occurring after the trial yielding the minimum of the scores, each of the trials including
         (i) providing a demand signal to a control loop having parameters,
         (ii) comparing a target signal to a response to the demand signal in the frequency domain, the target signal being a filtered version of the demand signal,
         (iii) generating a score based on the comparison, and
         (iv) adjusting values of the parameters, and
      output parameter values that yielded the minimum of the scores to auto-tune the control system.

9. The system of claim 8 wherein the target signal has a magnitude and spectral content less than or equal to a magnitude and spectral content of the demand signal.

10. The system of claim 8 wherein the demand signal represents white noise or broad spectrum noise.

11. The system of claim 8 wherein a selectable dynamic factor determines an extent to which the demand signal is filtered.

12. The system of claim 11 wherein a maximum value of the dynamic factor corresponds to a maximum frequency of the demand signal.

13. A control system comprising:
   at least one processor configured to repeatedly excite a control loop characterized by parameters having randomly selected values for each excitation and score a response of the control loop to each excitation relative to a target signal until the scores no longer achieve a value less than a minimum of the scores for a predefined number of excitations occurring after the excitation yielding the minimum of the scores to auto-tune the control system.

14. A computer implemented method for auto-tuning a control system, the method comprising:
   by a processor,
      performing a plurality of trials that each result in a score until the scores no longer achieve a value less than a minimum of the scores for a predefined number of trials occurring after the trial yielding the minimum of the scores, each of the trials including
         (i) providing a demand signal to a control loop having parameters,
         (ii) comparing a target signal to a response to the demand signal,
         (iii) generating a score based on the comparison, and
         (iv) randomly adjusting values of the parameters; and
      outputting parameter values that yielded the minimum of the scores to auto-tune the control system.

15. A computer implemented method for auto-tuning a control system, the method comprising:
   by a processor,
      performing a plurality of trials that each result in a score until the scores no longer achieve a value less than a minimum of the scores for a predefined number of trials occurring after the trial yielding the minimum of the scores, each of the trials including
         (i) providing a demand signal to a control loop having parameters,
         (ii) comparing a target signal to a response to the demand signal in frequency domain, the target signal being a filtered version of the demand signal,
         (iii) generating a score based on the comparison, and
         (iv) adjusting values of the parameters; and
      outputting parameter values that yielded the minimum of the scores to auto-tune the control system.

* * * * *